United States Patent [19]

McIntyre et al.

[11] Patent Number: 4,650,384
[45] Date of Patent: Mar. 17, 1987

[54] EXPANSION ANCHOR

[76] Inventors: Douglas O. McIntyre, The White Cottage, Heathfields, Royston, Hertfordshire; Robert W. Limbrick, 6 Meadow Rise, Bewdley, Worcester, both of England

[21] Appl. No.: 568,181
[22] PCT Filed: Sep. 17, 1982
[86] PCT No.: PCT/GB82/00272
  § 371 Date: Dec. 14, 1983
  § 102(e) Date: Dec. 14, 1983
[87] PCT Pub. No.: WO83/03646
  PCT Pub. Date: Oct. 27, 1983
[51] Int. Cl.[4] .............................................. F16B 13/06
[52] U.S. Cl. ........................................ 411/44; 411/50; 411/57
[58] Field of Search ................ 411/50, 49, 44, 57, 411/59, 63, 60, 45, 46, 55

[56] References Cited

U.S. PATENT DOCUMENTS

| 3,911,782 | 10/1975 | Liebig | 411/24 |
| 4,100,834 | 7/1978 | Harris | 411/60 |
| 4,478,542 | 10/1984 | Whelan | 411/60 X |
| 4,537,541 | 8/1985 | Giannuzzi | 411/55 |

FOREIGN PATENT DOCUMENTS

| 66537 | 9/1975 | Australia | 411/55 |
| 835521 | 4/1952 | Fed. Rep. of Germany | 411/49 |
| 2114036 | 10/1972 | Fed. Rep. of Germany | 411/60 |
| 2431617 | 2/1975 | Fed. Rep. of Germany | 411/49 |
| 2233518 | 1/1975 | France | |
| 2362299 | 3/1978 | France | |
| 1020865 | 2/1966 | United Kingdom | 411/55 |
| 1222557 | 2/1971 | United Kingdom | |
| 2094919 | 9/1982 | United Kingdom | 411/57 |

*Primary Examiner*—Gary L. Smith
*Assistant Examiner*—Adrian H. Whitcomb, Jr.
*Attorney, Agent, or Firm*—Rines and Rines Shapiro and Shapiro

[57] ABSTRACT

An expansion anchor for mounting in a receiving socket in base material to enable an object to be clamped thereto. The anchor comprises a longitudinally split tubular sleeve (1) to which an internally threaded expansion body (6) is retained by means of lugs (10) thereof engaging slots (2,3,11) in the body of the sleeve (1). The slots (2,3,11) are provided to permit the tubular sleeve (1) to expand into gripping contact with the receiving socket as the expansion body (6) is drawn axially within the sleeve (1) by a threaded anchor rod (15). The sleeve (1) is provided with support means (8,12,13,14) for the anchor rod (15) when in engagement with the expansion body (6). The support means (12,13,14) constitute telescopic spacer elments between the head of the anchor rod (15) and the tubular sleeve (1) which allow free relative movement between the expansion body (6) and the head of the anchor rod (15) until the anchor is set in the receiving socket. The arrangement is such that in the set condition the spacer element (12,13,14) and expansion body (6) assume positions around the rod (15) which together with the sleeve (1) provide for solidity of structure of the expansion anchor within the receiving socket. The expansion anchor is thus suitable for applications where high shear loads and vibrational forces are to be encountered.

5 Claims, 2 Drawing Figures

EXPANSION ANCHOR

FIELD OF THE INVENTION

The present invention relates to an expansion anchor for setting in a receiving socket.

BACKGROUND ART

Such expansion anchors are normally internally threaded for engagement by a threaded anchor bolt. The expansion anchor itself generally comprises an expansion body or sleeve on which is mounted an expansible body which can be expanded into gripping contact with the receiving socket by means of the expansion body being drawn within the sleeve by the threaded anchor being turned in the expansion body.

An expansion anchor is known which is provided with an expansible sleeve mounted on a waisted portion of an internally threaded tubular body between two abutments, one of which is tapered to provide a wedging effect when the tubular body is drawn axially of the sleeve by a threaded anchor bolt, to expand the sleeve into gripping contact with the receiving socket.

These prior known expansion anchors lack versatility of application and their manufacture tends to be a costly procedure and unnecessarily complicated.

SUMMARY OF THE INVENTION

It is an object of the invention amongst other things to provide an expansion anchor which by its less complicated design is cheaper to manufacture than the prior art device, and is more readily adaptable for use in anchorage fixings where high shear loads and vibrational forces are to be encountered and for which the fixing has to be designed to withstand.

According to one aspect of the invention there is provided an expansion anchor for setting in a receiving socket comprising a tubular sleeve which is split longitudinally, a plurality of longitudinally arranged slits or slots in the body of the sleeve to provide an expansible forward region thereof, a threaded expansion body which can be drawn within the sleeve to expand said front region by a threaded anchor rod to set the anchor, and a tubular support member engaged within a rearward region of the sleeve for supporting the shank of said anchor rod passing through the sleeve, said expansion body being provided with lugs which engage said slits or slots and retain the expansion body to the sleeve when in an unexpanded state.

One of the advantages of the above arrangement is that since the sleeve for retaining the expansion body and collar in assembly, is split longitudinally, it can be formed by first of all pressing out a piece of flat material, cutting the required number of slits or slots in the flat piece of material and then rolling the prepared piece into a tubular form, the slits or slots providing a forward expansible region of the sleeve.

The expansion anchor as above defined is particularly useful in applications where high shear loads and vibrational forces are to be encountered.

To this end the tubular support member may constitute a spacer element between the tubular sleeve and the anchor rod threadedly engaged in the expansion body.

Thus as the anchor rod is torqued up to the set position in a receiving socket, the spacer element moves within the tubular sleeve to eventually contact or substantially contact the expansion body which itself is being pulled within the tubular sleeve to effect expansion thereof., The relative dimensions of the component parts may be such that in the fully set condition, with an object to be clamped pulled hard against the receiving surface, the space between the body and the anchor rod and the tubular sleeve is occupied by the support member and the expansion body thus imparting rigidity to the structure.

Moreover to reach this condition none of the applied torque goes to uselessly loading the tubular sleeve due to the ability of the head of the anchor rod to continue moving relative to the expansion body up to the fully set position of the anchor, that is prior to the set position such relative movement is not impeded by contact between the head of the anchor rod and the tubular sleeve.

Other features and advantages of the present invention will become apparent from the description that follows.

BRIEF DESCRIPTION OF THE DRAWINGS

The invention will now be described by way of example with reference to the accompanying drawings wherein.

BEST MODES OF CARRYING OUT THE INVENTION

Figure 1:
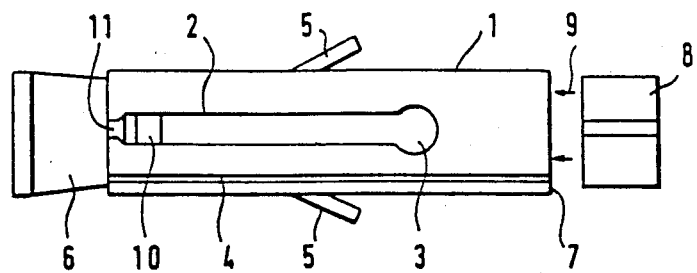
FIG. 1 is a side view of an expansion anchor according to one embodiment of the invention.

The expansion anchor shown in FIG. 1 comprises a tubular sleeve 1 provided with longitudinally extending slits or slots 2 of keyhole shape, that is by being opened out at their extremities 3 along the body of the sleeve 1, to ease expansion of the sleeve as will be described.

The sleeve 1 is longitudinally split at 4 and is provided with anti-rotation lugs 5 on its outer surface.

The longitudinally arranged slits or slots provide an expansible forward region of the sleeve 1 which is expanded by an expansion body 6 retained on the sleeve 1. The expansion body 6 is tapered as shown, the direction of taper being towards the sleeve 1 so that as the expansion body 6 is pulled or pushed within the sleeve 1 it expands the forward region thereof.

The expansion body 6 is internally threaded to receive the threaded end of an anchor bolt (not shown in FIG. 1) which can be passed through the sleeve via its rearward end 7. The shank of the anchor bolt is supported at the rearward end of the sleeve 1 by a split support collar 8 which is assembled with the sleeve 1 by being press-fit into the sleeve in the direction of the arrows 9.

The expansion body 6 is provided with one or more lugs 10 at its minimum diameter of taper and these lugs 10 movably engage the slits or slots 2 as shown.

The entrant portions of the slits or slots 2 are narrowed at 11 to retain the lugs within the slots or slits in the unexpanded condition of the sleeve 1, and thereby to retain the expansion anchor in assembly.

Figure 2:
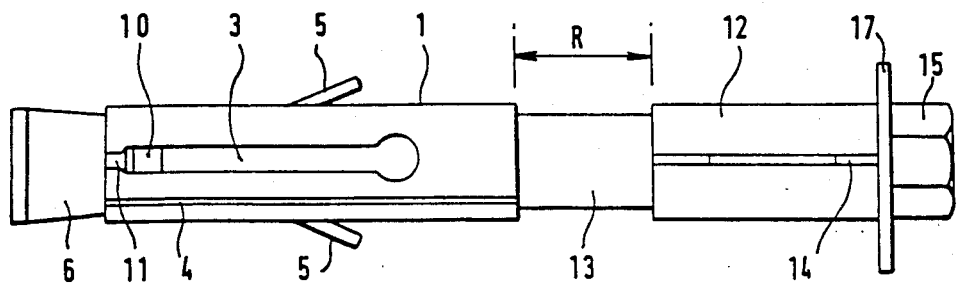
FIG. 2 is a side view of an anchor rod in combination with the expansion anchor of FIG. 1 according to another embodiment of the invention.

The modification shown in FIG. 2 has been designed to allow the expansion anchor of FIG. 1 to be lengthened thereby permitting deeper setting within a receiving socket, or to allow a part of the expansion anchor to be within an object being clamped to the receiving material by the anchor-engaging bolt.

In this embodiment a longitudinally split outer sleeve 12 of the same diameter as the sleeve 1 is coupled thereby by means of a tubular support member 13, one end of which is press-fit inserted in the rearward region of the sleeve 1 and the other end within the outer sleeve 12 to permit relative movement therebetween.

The other end of the outer sleeve 12 is provided with an internal collar 14 which is in press-fit engagement with the internal surface of the sleeve 12.

An anchor rod 15 passes through both sleeves 1 and 12, collar 14 and support member 13, and has a threaded end which engages the expansion body 6.

The assembly of the parts of the embodiment of FIG. 2 is such that prior to use the sleeve 12 is in abutment with a washer 17 at the head of the rod 15, the sleeves 1 and 12 are spaced apart by a distance R and the lugs 10 of the expansion body 6 are against the restricted entrant portions of the slots or slits 2.

With the arrangement as described inserted in a receiving socket in bare material, the anchor rod 15 is turned in the expansion body 6 which is then drawn axially within the sleeve 1 to expand the latter into engagement with the receiving socket. During this movement the sleeve 12 moves axially over the linking support member 13 in telescopic fashion to close or reduce the gap R until, with the expansion anchor set to the required loading in the socket the sleeve 12 comes into or substantially into abutment with the sleeve 1, and the object to be clamped, normally between the washer and the end of the sleeve 12, is brought firmly into contact with the bare material. In this position the relative dimensions of the component parts may be such that the member 13 is in contact with or substantially so, the expansion body 6, and the collar 14 similarly with the support member 13, thus providing solidity to the anchor bolt.

In an alternative embodiment the collar 14 of the arrangement shown in FIG. 2, may have a diameter greater than that of the linking tubular support member 13. This provides a tapering effect to the outer sleeve 12 so that in use the sleeve 12 grips the receiving socket for the fixing thus preventing the sleeve 12 and 14 together with the support member 13 falling out, or being readily removed from the socket, when the rod 15 is removed to release the object being clamped.

Further the sleeve 12 and collar 14 may be dispensed with and the linking support member mounted within the sleeve 1 and in abutment with the head of the rod 15, the distance R then corresponding to the spatial extent between the abutment provided by the end of the sleeve 1 and that provided by the washer 17 at the head of the bolt 15.

The relative dimensions of the sleeve 1 and support member 13 may be such that in the fully torqued-up condition of the anchorage bolt with the object to be clamped pulled hard against the bare material, the member 13 has moved, during axial movement of the bolt 15 in expansion body 6, into, or substantially into, abutment with the expansion body 6, thus providing as with the FIG. 2 embodiment solidity to the expansion anchor since the space between the sleeve and the shank of the rod 15 is occupied or substantially occupied by the material of the member 13 and the expansion body 6.

This is of great importance to enable the anchor to withstand high shear loads and moreover since no loading of the linking support member 13 occurs during torque-up, the anti-vibrational properties of the fixing as a whole are minimized, because the expended effort is wholly used to set the anchor in the receiving socket and clamp the object hard against the bare material.

Other variations of the embodiments as described above will be apparent to those skilled in the art within the scope of the present inventive disclosure.

For example in the FIG. 2 embodiment inter-engageable gripping means could be provided between the linking support member 13 and the respective sleeves 1 and 12 so that in the set position of the fixing the sleeve 12 could be retained within the receiving socket if the bolt 15 were subsequently removed.

We claim:

1. Expansion anchor apparatus comprising a tubular sleeve split along its entire length and having a plurality of slits extending longitudinally inward from a front end of the sleeve over a portion of its length, so as to render said portion of the sleeve expansible; an anchor rod having a threaded shank inserted into said tubular sleeve from a rear end of said sleeve; expansion body means threadably engaged with said shank of said anchor rod and movable into said front end of said sleeve for expanding said portion of said sleeve upon rotation of said anchor rod, said expansion body means including retaining lugs engaged with said plurality of slits, whereby said expansion body means is held in retainment on said sleeve when said sleeve is in an unexpanded state; tubular support means having one end disposed within said sleeve and another end abuttable with a head of said anchor rod for supporting said shank of said anchor rod, said tubular support means including a tubular support member which has an outer diameter slightly less than the inner diameter of said sleeve, a front end disposed within said sleeve, and a rear end projecting from said sleeve, said shank of said anchor rod passing through said tubular support member and said tubular support member being movable axially within said sleeve to permit relative movement of said head of said anchor rod toward said expansion body when said anchor rod is rotated to set said portion of said sleeve in an expanded condition; and a second tubular sleeve having a rear end abuttable with said head of said anchor rod and a front end slidably received over said rear end of said tubular support member so as to permit relative movement of said second sleeve toward the first-mentioned sleeve when said anchor rod is rotated to set said portion of said first-mentioned sleeve in an expanded condition.

2. Apparatus in accordance with claim 1, including said support means a collar disposed within said rear end of said second sleeve, with said shank of said anchor rod extending through said collar, said collar having an outer diameter greater than the inner diameter of said second sleeve.

3. Apparatus in accordance with claim 2, wherein said tubular support member and said collar are dimensioned lengthwise so as to substantially occupy the space between said expansion body and said head of anchor rod when said portion of said first-mentioned sleeve has been set in an expanded condition.

4. Apparatus in accordance with claim 1, said support means including a collar disposed with said rear end of said second sleeve, with said shank of said anchor rod extending through said collar, said collar having an outer diameter slightly less than the inner diameter of said second sleeve.

5. Apparatus in accordance with claim 4, wherein said tubular support member and said collar are dimensioned lengthwise so as to substantially occupy the space between said expansion body and said head of anchor rod when said portion of said first-mentioned sleeve has been set in an expanded condition.

* * * * *